United States Patent
Rittmann et al.

(10) Patent No.: US 11,814,996 B2
(45) Date of Patent: Nov. 14, 2023

(54) METHOD FOR OPERATING AN EXHAUST-GAS CATALYTIC CONVERTER

(71) Applicant: Robert Bosch GmbH, Stuttgart (DE)

(72) Inventors: Beate Rittmann, Ditzingen (DE); Jan Kappa, Ludwigsburg (DE); Marcel Alexander Schneck, Besigheim (DE); Michael Bachner, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 17/575,077

(22) Filed: Jan. 13, 2022

(65) Prior Publication Data

US 2022/0228519 A1    Jul. 21, 2022

(30) Foreign Application Priority Data

Jan. 15, 2021  (DE) ..................... 10 2021 200 331.1

(51) Int. Cl.
    *F02D 41/02* (2006.01)
    *F01N 3/20* (2006.01)

(52) U.S. Cl.
    CPC ......... *F01N 3/2013* (2013.01); *F01N 3/2033* (2013.01); *F02D 41/024* (2013.01); *F02D 2200/0802* (2013.01)

(58) Field of Classification Search
    CPC .... F01N 3/2013; F01N 3/2033; F01N 3/2006; F01N 3/2026; F01N 9/00; F01N 9/002;
    (Continued)

(56) References Cited

U.S. PATENT DOCUMENTS

2009/0071129 A1* 3/2009 Gonze ..................... F01N 3/027
                                                                60/286
2017/0362982 A1* 12/2017 Miao ..................... F01N 3/2026
(Continued)

FOREIGN PATENT DOCUMENTS

DE         4132814 A1    4/1993
DE        19504208 A1    8/1995

OTHER PUBLICATIONS

Otto et al., "Die Systementwicklung des elektrisch heizbaren Katalysators E-Kat fur die LEV/ULEV- und EU-III Gesetzgbung", MTZ Motortechnische Newspaper, vol. 56, Issue 9, 1995, 12 pages including statement of relevance.
(Continued)

*Primary Examiner* — Audrey B. Walter
*Assistant Examiner* — Dapinder Singh
(74) *Attorney, Agent, or Firm* — Michael Best & Friedrich LLP

(57) ABSTRACT

A method (200) for operating an exhaust-gas catalytic converter (130) with central coordination of heating measures that are intended to heat the exhaust-gas catalytic converter (130) to a temperature level at which the reactions to be catalyzed take place with an adequate reaction rate (so-called catalytic converter window). Through the central coordination of the heating measures on the basis of defined heating strategies, in which in each case one or more of the available heating measures are combined with one another in an expedient manner, the required outlay in terms of control can be considerably reduced, and mutual interference of the heating measures can be avoided.

9 Claims, 1 Drawing Sheet

(58) Field of Classification Search
CPC ..... F01N 2900/1602; F01N 2900/1404; F01N 2240/16; F02D 41/024; F02D 41/029; F02D 41/1446; F02D 41/0235; F02D 2200/0802; Y02T 10/12; Y02T 10/40
See application file for complete search history.

(56) References Cited

U.S. PATENT DOCUMENTS

| | | | |
|---|---|---|---|
| 2019/0264627 A1* | 8/2019 | Schröder ................. | F01N 3/023 |
| 2020/0240307 A1* | 7/2020 | Matsumura ............ | B01D 53/94 |
| 2020/0271046 A1* | 8/2020 | Kelly ...................... | F02B 37/10 |
| 2020/0340866 A1* | 10/2020 | Khaled ................ | G01K 15/005 |

OTHER PUBLICATIONS

Reif, "Abgabetechnik fur S. 92-94 unds S 109-110 Verbrennungsmotoren", Bosch Specialist Information for Automobiles, Springer, 2015, 11 pages including statement of relevance.

* cited by examiner

METHOD FOR OPERATING AN EXHAUST-GAS CATALYTIC CONVERTER

BACKGROUND OF THE INVENTION

The present invention relates to a method for operating an exhaust-gas catalytic converter of an internal combustion engine, and to a processing unit and a computer program for carrying out said method.

In order to adhere to legally prescribed emissions limit values, use may be made of three-way catalytic converters (three-way catalyst, TWC) that allow a conversion of the relevant gaseous pollutants NOx, HC and CO into harmless products such as N2, H2O and CO2. In order that these catalytic reactions take place as intended, the temperatures in the catalytic converter must generally exceed the so-called light-off temperature of typically 300-400° C. As soon as this temperature has been reached or overshot, the catalytic converter effects almost complete conversion of the relevant pollutants.

So-called engine-internal catalytic converter heating measures may be applied in order to reach this state as quickly as possible. Here, the efficiency of the gasoline engine is impaired by retarded ignition angles, and the exhaust-gas temperature and the enthalpy introduction into the catalytic converter are thus increased. The combustion stability can be ensured at the same time by means of adapted injection strategies (for example multiple injections).

Aside from these engine-internal catalytic converter heating measures, use may also be made of external catalytic converter heating measures, for example by means of electrically heatable catalytic converters or exhaust-gas burners. Such external heating measures are described for example in DE 41 32 814 A1 and DE 195 04 208 A1.

In order to further lower emissions in relation to conventional operation with engine-internal heating measures, in particular upon cold starting, that is to say when high loads are placed on the internal combustion engine in the cold state without an idling phase, so-called catalytic converter burners have proven to be a highly effective measure for accelerating TWC light-off.

SUMMARY OF THE INVENTION

The invention proposes a method for operating an exhaust-gas catalytic converter of an internal combustion engine, and a processing unit and a computer program for carrying out said method, having the features of the independent patent claims. Advantageous refinements are the subject matter of the dependent claims and the following description.

The invention uses a central coordination of heating measures that are intended to heat an exhaust-gas catalytic converter to a temperature level at which the reactions to be catalyzed take place with an adequate reaction rate (so-called catalytic converter window). Through the central coordination of the heating measures on the basis of defined heating strategies, in which in each case one or more of the available heating measures are combined with one another in an expedient manner, the required outlay in terms of control can be considerably reduced, and mutual interference of the heating measures can be avoided.

A method according to the invention for operating an exhaust-gas catalytic converter of an internal combustion engine specifically comprises an ascertainment of a temperature of the exhaust-gas catalytic converter, an ascertainment of a heating demand on the basis of the determined temperature, a selection of a heating strategy, taking into consideration the heating demand, from a multiplicity of different heating strategies which each comprise at least one of several heating measures, and an application of the selected heating strategy for heating the exhaust-gas catalytic converter. In this way, the complexity of the heating task that arises from a multiplicity of possible combinations of individual heating measures can be reduced to a manageable level without forfeiting flexibility. In particular, through the central control, it is for example the case that mutual influencing of the individual heating measures is suppressed, or can be taken into consideration from the outset.

The method advantageously furthermore comprises a predetermination of the different heating strategies, wherein the heating strategies differ from one another by different contributions of the heating measures comprised therein. This allows firstly an advantageous combination of measures that complement one another well and secondly also the flexible incorporation and enhancement of the various available measures, for example after retrofitting of a corresponding exhaust-gas aftertreatment system.

In particular, each heating strategy comprises a splitting of the heating demand between one or more of the respective heating measures of the heating strategy. The catalytic converter window can thus be reached optimally quickly.

The heating measures may comprise an ignition angle adaptation, fuel metering adaptation, rotational speed increase, valve lift adjustment, secondary air supply, air/fuel ratio adaptation, lambda splitting (that is to say different combustion chambers of the internal combustion engine are operated with different air/fuel ratios, such that the combustion does not take place completely but a stoichiometric ratio is present overall), activation of an electrical heating device, activation of a burner, and deactivation of overrun cut-off. These are particularly relevant options for the heating of an exhaust-gas catalytic converter. It is however self-evident that heating measures other than those mentioned here may also be suitable for use in the context of the method according to the invention.

The ascertainment of the temperature of the exhaust-gas catalytic converter preferably comprises a measurement of a temperature downstream of the internal combustion engine and/or a calculation on the basis of operating parameters of the internal combustion engine. Depending on the configuration of the exhaust-gas aftertreatment system, it is thus possible for the temperature to be ascertained in the respectively suitable manner.

The splitting of the heating demand advantageously comprises a selection of the heating measure(s) to be applied and/or a determination of a sequence of the application of individual heating measures and/or a determination of a respective application intensity for every applied heating measure. Flexible options are thus available for accurately providing the ascertained heating demand.

The method preferably comprises an ascertainment of success of the application of the selected heating strategy on the basis of the ascertained temperature of the exhaust-gas catalytic converter. This constitutes a particularly advantageous aspect with regard to the precise control of the heating measures.

Here, the method advantageously additionally comprises an adaptation of the selection of the heating strategy in a manner dependent on the ascertained success. Direct intervention in the control of the heating process is thus possible, in particular if the actual behavior differs from that which is expected, that is to say, for example, if one of the heating measures is affected by a fault and the expected success is therefore not achieved.

A processing unit according to the invention, for example a control unit of a motor vehicle, is configured, in particular in terms of programming, to carry out a method according to the invention.

The implementation of a method according to the invention in the form of a computer program or computer program product containing program code for performing all of the method steps is also advantageous, since this entails particularly low costs, in particular when an executing control device is also used for other tasks and is therefore present in any case. Suitable data carriers for providing the computer program are in particular magnetic, optical and electrical memories, such as for example hard disks, flash memories, EEPROMs, DVDs and the like. It is also possible to download a program via computer networks (the Internet, an intranet, etc.). In particular, a new software function structure, based on this invention, in the form of a "heating measure coordinator" makes it possible for new and existing measures for heating catalytic converters in the exhaust-gas tract to be integrated and activated quickly and clearly at a program level. The flexible prioritization and stipulation of the active measures for heating catalytic converters, and of the possible substitute measures for this in the event of a lack of effectiveness, are particularly advantageous here. A further major advantage is the possibility of simple enhancement to include additional measures for heating catalytic converters, which will likely become necessary with regard to increasing demands arising from more stringent emissions regulations.

Further advantages and refinements of the invention will become apparent from the description and the accompanying drawing.

The invention is illustrated schematically in the drawing on the basis of an exemplary embodiment and is described below with reference to the drawing.

DETAILED DESCRIPTION

Figure 1:
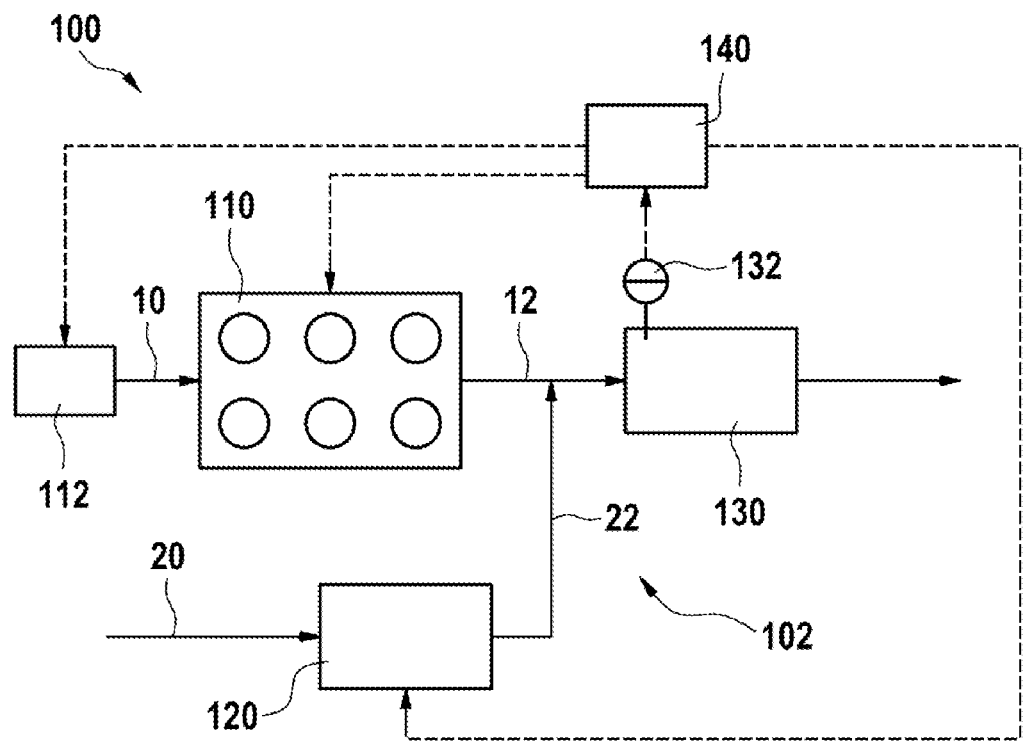
FIG. 1 shows, in a highly schematic illustration, an arrangement that is configured for carrying out an advantageous embodiment of a method according to the invention.
Figure 2:
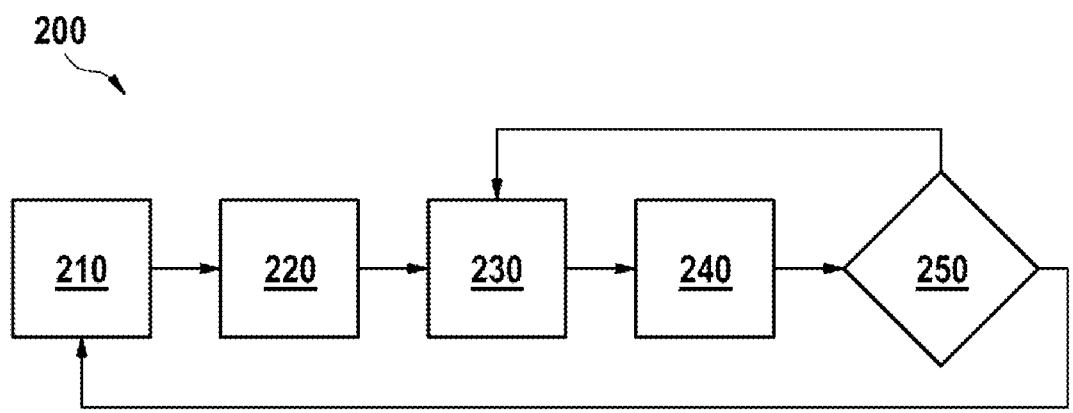
FIG. 2 shows an advantageous configuration of a method according to the invention in the form of a simplified flow diagram.

FIG. 1 schematically illustrates an arrangement 100, which can be used for example in a vehicle, having an internal combustion engine 110 and an exhaust-gas aftertreatment system 102.

The internal combustion engine 110 may for example be in the form of a gasoline engine, of a diesel engine and/or of a Wankel or rotary piston engine. A lean-burn engine with applied ignition may also be used as the internal combustion engine 110.

The exhaust-gas aftertreatment system 102 is arranged downstream of the internal combustion engine 110 and comprises at least one catalytic converter 130 and, for example, a heating device, for example an exhaust-gas burner 120.

In the example illustrated, the exhaust gas 22 from the exhaust-gas burner 120 is introduced, downstream of the internal combustion engine 110, into the exhaust pipe 12 of said internal combustion engine. This merging takes place upstream of the at least one catalytic converter 130, because this must be brought to a minimum required operating temperature before every operating phase. Valves for opening and closing the merging point may also be provided in the implementation.

The catalytic converter 130 may for example comprise a three-way catalytic converter (for gasoline engines; for example $NO_x$ storage catalytic converter or oxidation catalytic converter for diesel engines). Provision may furthermore be made for further similar and/or other catalytic converters and/or filter systems, for example soot particle filters, to be integrated into the exhaust-gas aftertreatment system 102. It is also possible for multiple different catalytic converter types to be combined in a single multifunction catalytic converter, as is common for example in a three-way catalytic converter.

The exhaust-gas burner 120 may be activated as a first heating measure for warming the exhaust-gas aftertreatment system 102. For this purpose, it is for example possible for an air-fuel mixture 20 to be fed to, and burned in, the burner 120. The burner exhaust gas 22 that is generated in the process is, as mentioned, conducted into the catalytic converter 130 in order to warm the latter.

A second heating measure may be provided in the form of an enrichment of the air/fuel mixture 10 supplied to the internal combustion engine 110 by means of a fuel treatment unit 112, for example an injection system.

As has also been mentioned in the introduction, further options for different heating measures are also an ignition angle adjustment (in particular in the case of applied-ignition engines), an adaptation of the injection times and/or quantity, etc. A processing unit 140, for example an engine control unit, activates the various components in order to implement the respective heating measure. For this purpose, the control unit 140 has a data-transmitting connection to the internal combustion engine 110, to the fuel treatment unit 112 and to the exhaust-gas burner 120.

Here, in an ascertainment step 210, the temperature of the catalytic converter 130 can be monitored for example by means of a temperature sensor 132, which may be provided for example in the form of a thermocouple, or other means for temperature detection, such as computational models. Here, the temperature is transmitted to the processing unit 140. In a step 220, the control unit 140 can ascertain a heating demand in a manner dependent on the temperature thus detected. For this purpose, it is for example possible for the ascertained temperature to be compared with one or more threshold values, in particular a minimum temperature and/or normal operating temperature. The heating demand is obtained in a manner dependent on the ascertained temperature or on the difference between the ascertained temperature and the one or more threshold values, for example in the form of a minimum heat quantity required to reach the respective threshold value.

In a step 230, the method 200 thereupon stipulates a heating strategy, or selects this from a multiplicity of different heating strategies, on the basis of the ascertained heating demand. A heating strategy comprises in each case at least one heating measure, and is preferably predefined. The heating strategy may for example be defined centrally in the form of a heating strategy vector. This includes a stipulation of what heating measures are to be combined in a strategy. The heating strategy vector can in particular be utilized to limit the multiplicity of possible combinations to a sensible level without causing curtailments to the flexibility of the selection. The individual heating measures may then, for example, be centrally scaled and coordinated on the basis of a continuous, normalized heating demand factor.

For example, a heating strategy for a cold start situation may comprise the following heating measures:

activation of secondary air in conjunction with a retarded ignition angle (and thus a higher exhaust-gas temperature at the inlet of the catalytic converter 130) and engine-internal enrichment with the aim of an exothermic reaction (of secondary air and HC from rich combustion) at the inlet of the catalytic converter 130.

One possible alternative heating strategy, which is selected in particular in a situation in which there is a fault in the secondary air system or the temperature at the inlet of the catalytic converter 130 is not sufficiently high, comprises, for example the following heating measures: a retarded ignition angle with a slightly lean air/fuel mixture with the aim of increasing the exhaust-gas temperatures as quickly as possible without an exothermic reaction outside the internal combustion engine 110.

Each heating strategy may optionally additionally include, as heating measures, the setting of an increased idling rotational speed of the internal combustion engine 110, and further, for example external, heating measures.

In some configurations of the method 200, the selection of the heating strategy may be influenced not only by the ascertained heating demand but also by further parameters, for example a present load demand or the like, so as to have the least possible negative influence on the general usability.

In a heating step 240, the control unit 140 controls the heating measures that are included in the selected heating strategy. In particular, the sequence or prioritization of said heating measures in relation to one another, and/or the respective intensity of application of said heating measures, can be advantageously influenced. For example, in one particular heating strategy, burner operation and an ignition angle adjustment may be provided as heating measures. In the context of this particular heating strategy, it is however possible for the proportional contributions of each of these two heating measures to the overall heating power to be variable, such that, in the heating step 240, this overall heating power can be flexibly adapted to the specifically determined heating demand. This can for example result in an advantage with regard to the burner efficiency if said burner can be operated as far as possible at an optimum operating point, and a possible remaining heating demand is provided by means of the other heating measures within the selected heating strategy.

Furthermore, in an evaluation step 250, the control unit may decide whether the heating measure is or has been successful. For example, for this purpose, a predetermined time may be allowed to elapse, and the temperature ascertained after this time may be compared with a temperature ascertained before this time. If the temperature ascertained after the time corresponds to a temperature that is expected owing to the heating measure, the method 200 can assume that an implementation of the heating measure has been successful and return to step 210, wherein a different heating strategy may then be selected on the basis of the temperature ascertained here.

By contrast, if it is established in step 250 that the heating measure has not been successful, it can be assumed that there has been a fault in the measure, for example a malfunction of the exhaust-gas burner 120. In such a case, the method may return directly to step 230 and select an alternative heating strategy, preferably one in which the non-functioning heating measure does not play a role.

It is self-evident that the configuration of the method 200 as a stepwise approach, as discussed here, has been described merely for the purposes of explaining the concept on which the invention is based. The method 200 may however also be of continuous configuration, or the steps may be performed in a different, for example partially reversed sequence. It is also possible for some steps to be performed simultaneously or in an integrated manner.

It is furthermore emphasised that further options for temperature ascertainment, for example model-based options, may be considered and may be advantageous in particular cases. Temperature sensors 132 may also be provided at other locations within and/or outside the exhaust-gas aftertreatment system 102 and used in the context of the invention.

The invention claimed is:

1. A method (200) for operating an exhaust-gas catalytic converter (130) of an internal combustion engine (110), the method comprising
    ascertainment (210) of a temperature, via a temperature sensor, of the exhaust-gas catalytic converter (130),
    ascertainment (220) of a heating demand, via an electronic processor, on the basis of the determined temperature,
    coordination, via the electronic processor, of a plurality of heating measures by selecting, based on the heating demand, a heating strategy from a multiplicity of heating strategies comprising the use of at least of the plurality of heating measures, and
    application (240) of the selected heating strategy, via the electronic processor, for heating the exhaust-gas catalytic converter (130),
    wherein the plurality of heating measures comprise at least two selected from the group consisting of ignition angle adaptation, fuel metering adaptation, rotational speed increase, valve lift adjustment, secondary air supply, air/fuel ratio adaptation, lambda splitting, activation of an electrical heating device, activation of a burner, and deactivation of overrun cut-off,
    wherein coordination of the plurality of the heating measures includes taking into consideration the mutual influencing of the plurality of heating measures on the ascertained temperature of the exhaust-gas catalytic converter, and
    wherein the exhaust-gas catalytic converter is a three-way catalytic converter configured to convert gaseous pollutants into less harmful products.

2. The method (200) according to claim 1, further comprising a predetermination of different heating strategies in the plurality of heating strategies, wherein the different heating strategies differ from one another by different contributions of at least one heating measure comprised therein.

3. The method (200) according to claim 1, wherein each heating strategy comprises a splitting of the heating demand between at least one heating measure comprised therein.

4. The method (200) according to claim 3, wherein the splitting comprises a selection of the heating measure(s) to be applied and/or a determination of a sequence of the application of individual heating measures and/or a determination of a respective application intensity for every applied heating measure.

5. The method (200) according to claim 1, wherein the ascertainment (210) of the temperature of the exhaust-gas catalytic converter (130) comprises a measurement of a temperature downstream of the internal combustion engine (110) and/or a calculation on the basis of operating parameters of the internal combustion engine (110).

6. The method (200) according to claim 1, comprising an ascertainment (250) of success of the application of the selected heating strategy on the basis of the ascertained temperature of the exhaust-gas catalytic converter (130).

7. The method (200) according to claim 6, comprising an adaptation of the selection of the heating strategy in a manner dependent on the ascertained success.

8. A processing unit (140) configured to control operation of an exhaust-gas catalytic converter (130) of an internal combustion engine (110), by
- ascertaining (210) a temperature, via a temperature sensor, of the exhaust-gas catalytic converter (130),
- ascertaining (220) a heating demand on the basis of the determined temperature,
- coordinating, via the electronic processor, a plurality of heating measures by selecting, based on the heating demand, a heating strategy from a multiplicity of heating strategies comprising the use of at least one of the plurality of heating measures, and
- applying (240) the selected heating strategy for heating the exhaust-gas catalytic converter (130),
- wherein the plurality of heating measures comprise at least two selected from the group consisting of ignition angle adaptation, fuel metering adaptation, rotational speed increase, valve lift adjustment, secondary air supply, air/fuel ratio adaptation, lambda splitting, activation of an electrical heating device, activation of a burner, and deactivation of overrun cut-off,
- wherein coordinating the plurality of the heating measures includes taking into consideration the mutual influencing of the plurality of heating measures on the ascertained temperature of the exhaust-gas catalytic converter, and
- wherein the exhaust-gas catalytic converter is a three-way catalytic configured to convert gaseous pollutants into less harmful products.

9. A non-transitory, computer-readable storage medium containing instructions that when executed by a computer cause the computer to control operation of an exhaust-gas catalytic converter (130) of an internal combustion engine (110), by
- ascertaining (210) a temperature, via a temperature sensor, of the exhaust-gas catalytic converter (130),
- ascertaining (220) a heating demand on the basis of the determined temperature,
- coordinating, via the electronic processor, a plurality of heating measures by selecting, based on the heating demand, a heating strategy from a multiplicity of heating strategies comprising the use of at least one of the plurality of heating measures, and
- applying (240) the selected heating strategy for heating the exhaust-gas catalytic converter (130),
- wherein the plurality of heating measures comprise at least two selected from the group consisting of ignition angle adaptation, fuel metering adaptation, rotational speed increase, valve lift adjustment, secondary air supply, air/fuel ratio adaptation, lambda splitting, activation of an electrical heating device, activation of a burner, and deactivation of overrun cut-off,
- wherein coordinating the plurality of the heating measures includes taking into consideration the mutual influencing of the plurality of heating measures on the ascertained temperature of the exhaust-gas catalytic converter, and
- wherein the exhaust-gas catalytic converter is a three-way catalytic converter configured to convert gaseous pollutants into less harmful products.

* * * * *